(12) United States Patent
Horie et al.

(10) Patent No.: US 8,103,111 B2
(45) Date of Patent: Jan. 24, 2012

(54) CODING METHOD, ELECTRONIC CAMERA, RECORDING MEDIUM STORING CODED PROGRAM, AND DECODING METHOD

(75) Inventors: Kenichi Horie, Machida (JP); Seiichiro Sakata, Akiruno (JP)

(73) Assignee: Olympus Imaging Corp., Tokyo (JP)

( * ) Notice: Subject to any disclaimer, the term of this patent is extended or adjusted under 35 U.S.C. 154(b) by 1035 days.

(21) Appl. No.: 11/963,940

(22) Filed: Dec. 24, 2007

(65) Prior Publication Data

US 2008/0152215 A1    Jun. 26, 2008

(30) Foreign Application Priority Data

Dec. 26, 2006 (JP) ................. 2006-350717

(51) Int. Cl.
*G06K 9/36* (2006.01)
*H04N 5/228* (2006.01)
(52) U.S. Cl. ................... 382/232; 348/222.1
(58) Field of Classification Search ............ 382/232; 348/222.1
See application file for complete search history.

(56) References Cited

U.S. PATENT DOCUMENTS

| 5,076,687 | A | | 12/1991 | Adelson | |
|---|---|---|---|---|---|
| 6,009,188 | A | * | 12/1999 | Cohen et al. | 382/154 |
| 6,097,394 | A | | 8/2000 | Levoy et al. | |
| 6,476,805 | B1 | * | 11/2002 | Shum et al. | 345/420 |
| 2004/0114807 | A1 | * | 6/2004 | Lelescu et al. | 382/229 |
| 2005/0244065 | A1 | * | 11/2005 | Malvar et al. | 382/239 |
| 2005/0265444 | A1 | * | 12/2005 | Kim | 375/240.1 |
| 2007/0252074 | A1 | * | 11/2007 | Ng et al. | 250/208.1 |
| 2008/0131019 | A1 | * | 6/2008 | Ng | 382/255 |
| 2008/0193026 | A1 | * | 8/2008 | Horie et al. | 382/238 |
| 2008/0266655 | A1 | * | 10/2008 | Levoy et al. | 359/368 |

OTHER PUBLICATIONS

"Survey of Image-Based Representations and Compression Techniques," Heung-Yeung Shum, et al, IEEE Transactions on Circuits and Systems for Video Technology, vol. 13, No. 11, Nov. 2003, pp. 1020-1037.*
T. Takano, et al., "3-D Space Coding Based on Light Ray Data," *Journal of The Institute of Image Information and Television Engineers*, vol. 52, No. 1, pp. 1321-1327, 1998 (Japan).
Ren Ng, et al., "Light Field Photography with a Hand-held Plenoptic Camera," *Stanford Tech Report CTSR 2005-02*.
Ren Ng, "Fourier Slice Photography," (presented at *AMC SIGGRAPH 2005*, pp. 735-744 (Jul. 31, 2005-Aug. 4, 2005)).

* cited by examiner

*Primary Examiner* — Wengpeng Chen
(74) *Attorney, Agent, or Firm* — John C. Pokotylo; Straub & Pokotylo

(57) ABSTRACT

In a method of coding light ray information including information about a position on a predetermined surface and information about an incident angle to the surface when a ray of light from a subject enters the surface, the light ray information is divided into two or more processing unit blocks. In a first coding process, coding are executed for each of the two or more processing unit blocks, and first block unit information composing first image information about the subject is obtained. In a second coding process, coding are executed for each of the two or more processing unit block, and second block unit information composing second image information different types from the first image information is obtained.

11 Claims, 15 Drawing Sheets

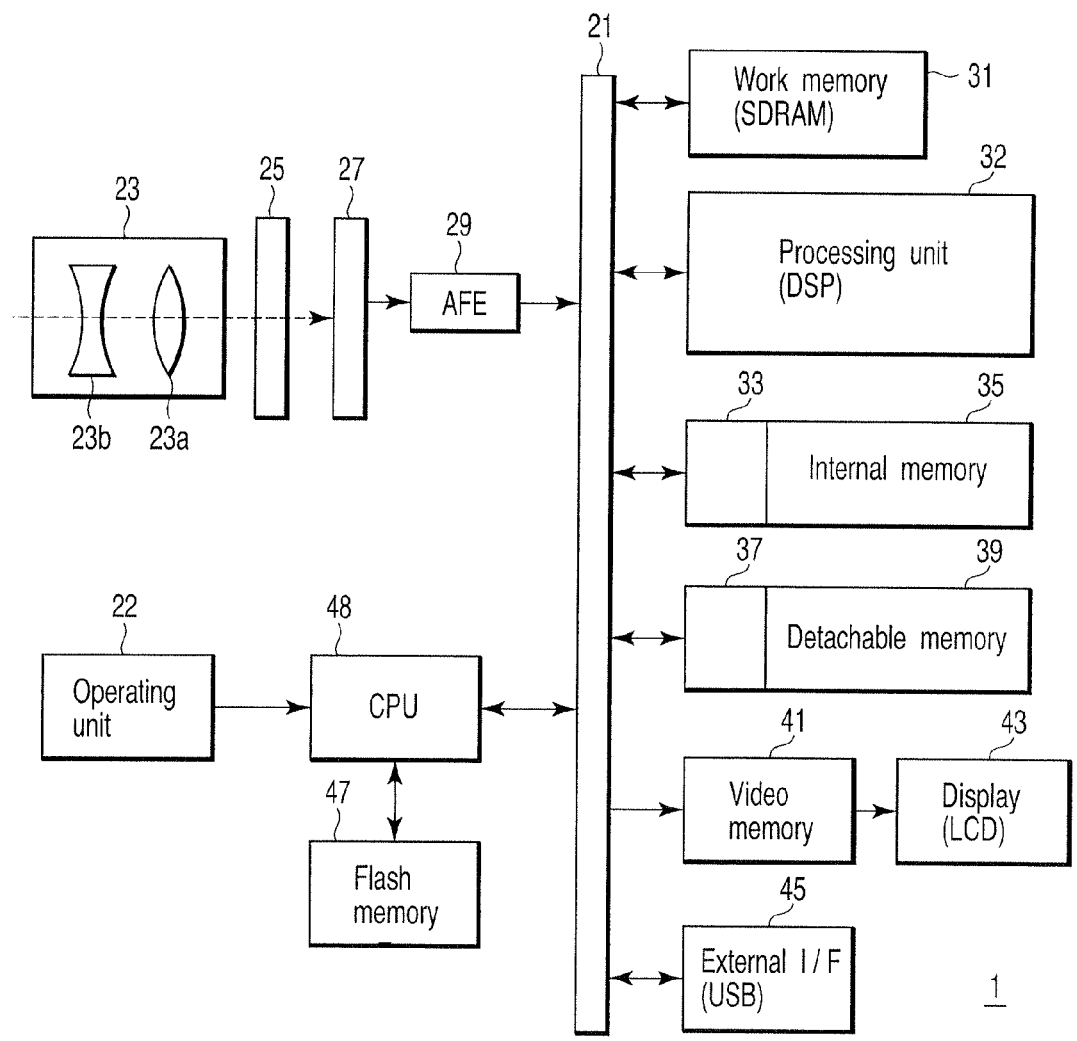
F I G. 1

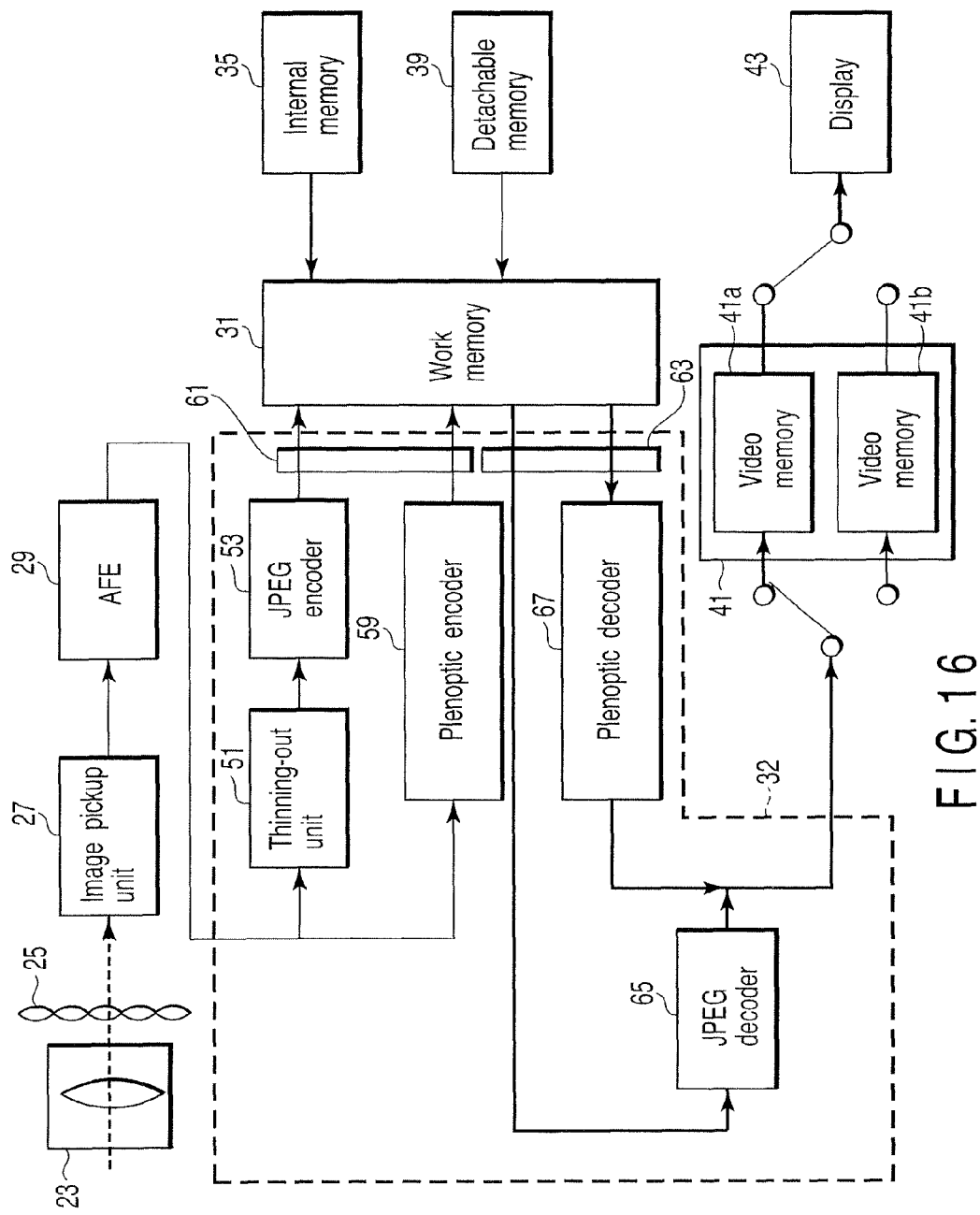
F I G. 16

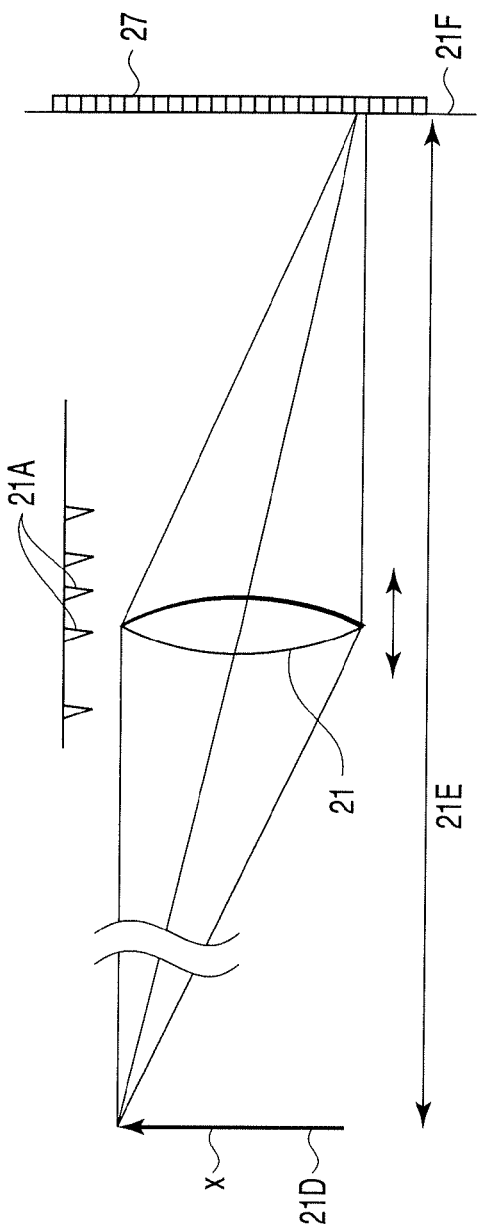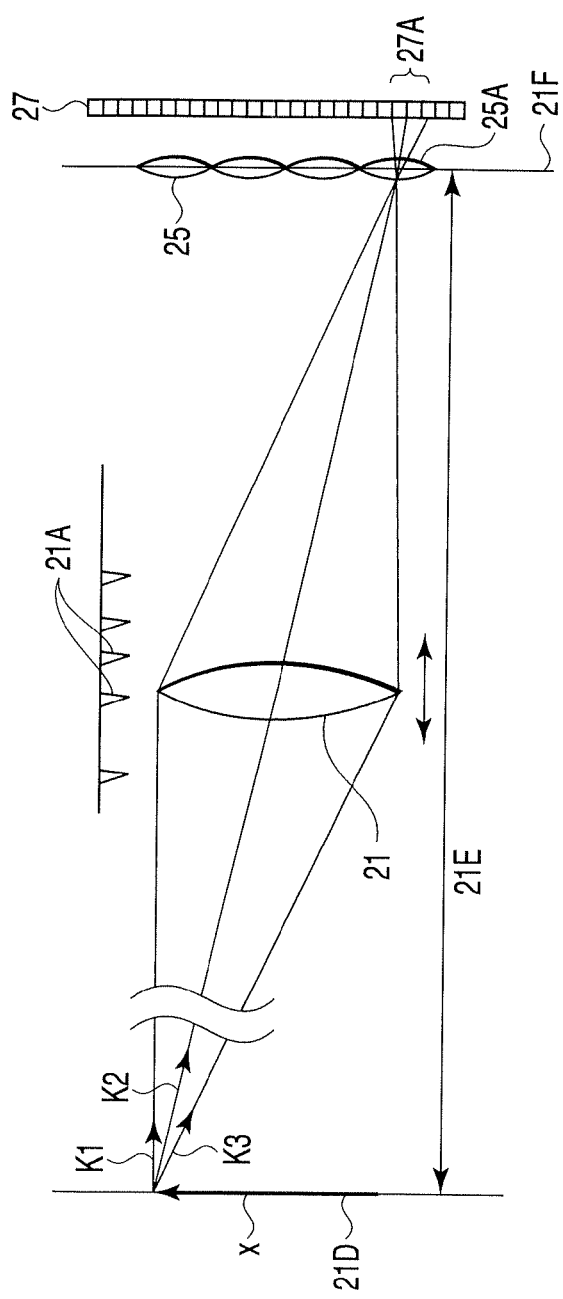
FIG. 19A PRIOR ART
FIG. 19B PRIOR ART

CODING METHOD, ELECTRONIC CAMERA, RECORDING MEDIUM STORING CODED PROGRAM, AND DECODING METHOD

CROSS-REFERENCE TO RELATED APPLICATIONS

This application is based upon and claims the benefit of priority from prior Japanese Patent Application No. 2006-350717, filed Dec. 26, 2006, the entire contents of which are incorporated herein by reference.

BACKGROUND OF THE INVENTION

1. Field of the Invention

The present invention relates to a coding method for coding an image taken by a plenoptic camera, an electronic camera, a recording medium storing a coded program, and a decoding method of decoding a coded image.

2. Description of the Related Art

FIG. 20 shows a focusing function of an ordinary camera. Light is condensed through a focusing lens 21 and other not-shown optical systems (e.g., a zoom optical system), and projected on an image pickup element 27 arranged at an image plane 21F. The position of the focusing lens 21 with respect to the image plane 21F is changeable along the optical axis 21H, as indicated by the arrow 21B. The position of the focusing lens 21 is used for processing the firmware of a camera upon control of auto-focus (AF), for example. The position of the focusing lens 21 is managed by discrete numeric values. The reference numeral 21A in the drawing indicates such a "focus value".

When the optical system of an ordinary camera is complicated, or includes a zoom mechanism, the focusing lens 21 is composed of a lens group including two or more lenses. The focus value 21A of such camera indicates the changeable and controllable total conditions of such a lens group.

Basically, a lens of a camera forms, on a plane, an image of an object that exists on another plane. Here, a plane whose image is formed on the image plane 21F without a blur via the focusing lens 21 arranged at a predetermined focus value is called "a best object plane". When a subject is placed on a best object plane 21D, the image of the subject is formed on the image pickup element 27 in a completely focused state. By changing the focus value 21A, the subject distance 21E, which is a distance from the image plane 21F to the best object plane 21D, can be changed. The focus value 21A and subject distance 21E correspond one-to-one each other.

Actually, there is a depth of field 21G corresponding to an allowable blur range, and even if an object plane 21J is displaced from the best object plane 21D by the length of the depth of field 21G, an image is projected on the image pickup element 27 in a substantially focused state.

FIG. 19A shows the case of photographing with such an ordinary camera. First, the focus on a subject X is adjusted by the operation of auto focus or manual focus. This operation corresponds to adjustment of the best object plane 21D to the subject plane of a subject X by moving the focusing lens 21 in the direction of the optical axis 21H. FIG. 19A shows the state that the focusing lens 21 is moved to a certain focus value 21A, and the best object plane 21D coincides with the subject plane of the subject X. When a release button is pressed in this state, light from the subject X is projected on the image pickup element 27 through the focusing lens 21 in focus.

Contrarily, in a plenoptic camera, light from the subject X is projected on a micro lens array 25, as shown in FIG. 19B. Namely, the micro lens array 25 is provided on the image plane 21F in FIG. 19B, and the image pickup element 27 is arranged on a plane behind the image plane 21F. In this structure, various rays of light K1, K2 and K3 from the subject X projected on the micro lens array 25 are separated by each micro lens 25A, and projected on a part 27A of the image pickup element 27. Therefore, the information formed by the part 27A of the image pickup element includes the information about the directions of the rays of light. The light from the subject X is projected on the micro lens array 25. Therefore, the result of image formation by the image pickup element 27 may include position information indicating the position of a subject from which a ray of light is radiated.

As described above, image information (light field image) as a result of the image formation by an image pickup element of a plenoptic camera includes information about rays of light in a space (light ray information). Therefore, a plenoptic camera can perform sampling of four-dimensional light ray information.

U.S. Pat. No. 6,097,394 describes a method of coding light ray information (light field image information). The method adopts vector quantization to increase a decoding speed. In this method, vector quantized data is decoded by referring to an index in a codebook and outputting it, unlike the predictive coding adopted in a Moving Picture Experts Group (MPEG) system.

In the method of U.S. Pat. No. 6,097,394, light ray information is vector quantized, and the codebook and index used for vector quantization are LZ (Lempel-Ziv) coded, and incorporated into a bit stream. To improve the image quality, for example, coding by trial-and-error is performed until an appropriate codebook is generated for the first time, and a set of training is generated.

BRIEF SUMMARY OF THE INVENTION

According to a first aspect of the present invention, there is provided a method of coding light ray information including information about a position on a predetermined plane and information about an incident angle to the plane when a ray of light from a subject enters the plane, comprising: dividing the light ray information into two or more processing unit blocks; executing a first coding process to obtain first block unit information composing first image information about the subject by coding each of the processing unit blocks; and executing a second coding process to obtain second block unit information composing second image information different types from the first image information by coding each of the processing unit blocks.

According to a second aspect of the present invention, there is provided a method of coding light ray information that is pixel data arranged in two dimensions obtained by receiving a ray of light from a subject by an image pickup element and includes information about a position on a predetermined plane and information about an incident angle when a ray of light from a subject enters the plane, comprising: dividing the light ray information into two or more two-dimensional blocks including two or more the pixel data and information about an angle of the ray of light spreading in a different direction from the subject; obtaining two or more processing unit blocks, wherein each of two or more processing unit blocks comprises of two or more two-dimensional blocks; executing a first coding process to obtain first block unit information composing first image information about the subject by coding each of the processing unit blocks; and executing a second coding process to obtain second block unit information composing second image information different types from the first image information by coding each of the processing unit blocks.

According to a third aspect of the present invention, there is provided an electronic camera comprising: a focusing lens; a micro lens array which is arranged at a focal position of the focusing lens, and composed of two or more micro lenses; an image pickup element which is composed of two or more pixels arranged in two dimensions to convert a subject image formed by sequentially passing the focusing lens and micro lens array, into an electric signal; a coding unit which codes light ray information corresponding to the result of receiving light by the two or more pixels; wherein the light ray information includes information about a position on a plane of the micro lens array and information about an incident angle to the plane of the micro lens array when a ray of light from the subject enters the plane via the focusing lens and micro lens array, and the coding unit divides the light ray information into two or more processing unit blocks, and executes a first coding process to obtain first block unit information composing first image information about the subject by coding each of the two or more processing unit blocks and a second coding process to obtain second block unit information composing second image information different types from the first image information by coding each of the processing unit blocks, wherein the first and second coding process are executed for each of the two or more processing blocks.

According to a fourth aspect of the present invention, there is provided a computer readable recording medium storing a coded program for coding light ray information including information about a position on a predetermined plane and information about an angle incident to the plane when a ray of light from a subject enters the plane, wherein the program causes a computer to execute the following functions: a function for dividing the light ray information into two or more processing unit blocks; a function for executing a first coding process to obtain first block unit information composing first image information about the subject by coding each of the two or more processing unit blocks, for each of the processing unit blocks; and a function for executing a second coding process to obtain second block unit information composing second image information different types from the first image information by coding each of the processing unit blocks, for each of the processing unit blocks.

According to a fifth aspect of the present invention, there is provided a method of decoding coded light ray information including information about a position on a predetermined plane and information about an incident angle to the plane when a ray of light from a subject enters the plane, comprising: generating first block unit information composing first decoded image information obtained by decoding first image information about the subject obtained by coding the light ray information for each predetermined processing unit block; and generating second block unit information composing second decoded image information obtained by decoding second image information related to the subject and coded using a coding method different from that of the first image information, for the each predetermined processing unit block.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram of a digital camera according to an embodiment of the invention;

FIG. 16 is a diagram for explaining the flow of data in the reproducing process shown in FIG. 15;

FIG. 19A is diagram for explaining the principle of image pickup of a conventional camera;

FIG. 19B is a diagram for explaining the principle of image pickup of a plenoptic camera.

DETAILED DESCRIPTION OF THE INVENTION

Figure 2:
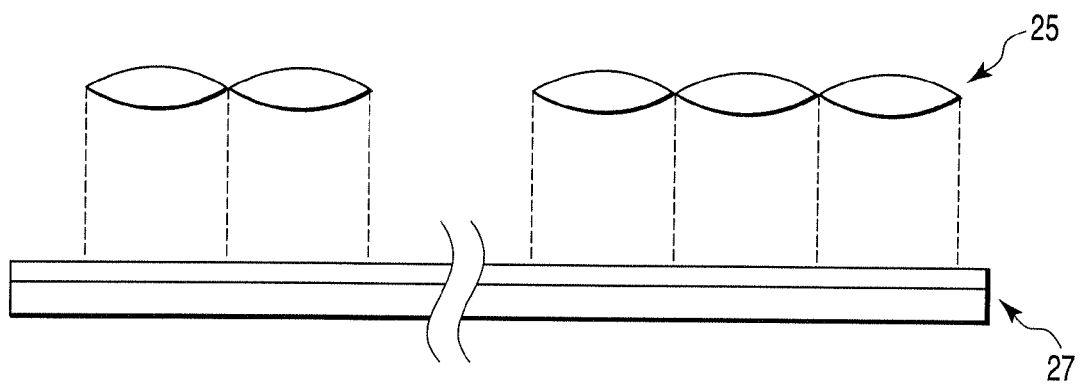
FIG. 2 is a diagram for explaining the relationship between a micro lens and a pixel of an image pickup unit shown in FIG. 1.

FIG. 1 is a block diagram of a digital camera 1 according to an embodiment of the invention. As shown in FIG. 1, the digital camera 1 has an operating unit 22, an optical system 23, a micro lens array 25, an image pickup unit 27, an analog front-end (AFE) 29, a work memory 31, a processing unit 32, a memory interface 33, an internal memory 35, a memory interface 37, a detachable memory 39, a video memory 41, a display 43, an external interface 45, a flash memory 47, and a CPU 48, for example.

The AFE 29, work memory 31, processing unit 32, memory interface 33, memory interface 37, video memory 41, external interface 45, and CPU 48 are electrically connected through a signal cable 21.

The operating unit 22 outputs an operating signal corresponding to the user's operation, to the CPU 48. The operating unit 22 includes various operating members, such as a power supply button to turn on the power supply of the digital camera 1, and a release button to execute photographing of a still picture.

The optical system 23 includes a focusing lens 23a and a zoom lens 23b, condenses the light from a subject, and emits it to the micro lens array 25. The focusing lens 23a projects the light from points of a subject on one convergence point on the micro lens array 25.

Figure 3:
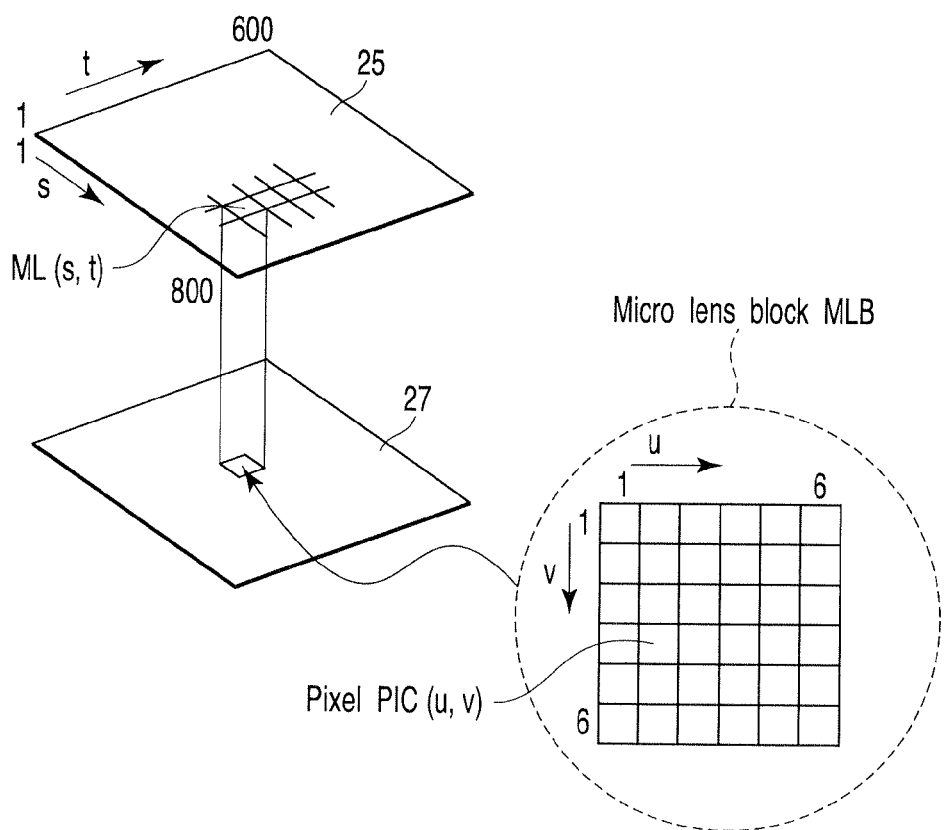
FIG. 3 is diagram for explaining a micro lens block.

The micro lens array 25 comprises two or more micro lenses ML (s, t) arranged like an s×t matrix, as shown in FIG. 2 and FIG. 3. Each micro lens separates the light (a converged light beam) emitted from each of the points of the subject, according to the direction (angle) of each of the light emitted from those points, and projects each of the separated light on a corresponding pixel on the surface of the image pickup element of the image pickup unit 27.

In this embodiment, the two-dimensional form of each micro lens composing the micro lens array 25 is the same as the two-dimensional form of the focusing lens 23a. The two-dimensional form is a rectangle, for example. As the two-dimensional forms of the micro lens and focusing lens 23a are the same, the number of (wasted) pixels not to accept effective light, among 6×6 pixels composing a micro lens block MLB (s, t), can be reduced.

The image pickup unit 27 is a CCD sensor or a CMOS sensor, and is located on the opposite side of the optical system 23 with respect to the micro lens array 25. The image pickup unit 27 may be either a one-panel type or three-panel type. The image pickup element of the image pickup unit 27 has a light-receiving surface composed of two or more pixels arranged as a matrix. The shape of the light-receiving surface of each pixel is rectangular, for example. In this embodiment, the shapes of the focusing lens 23a, each of the micro lenses, and the light-receiving surface of the image pickup element are the same, rectangular. Therefore, of the light incident from the focusing lens 23a, the ratio of the light not received by a pixel of the image pickup unit 27 can be decreased, and the light-receiving sensitivity of the image pickup unit 27 can be increased.

In this embodiment, for example, the pixels composing the image pickup unit 27 are handled as a unit of 6×6 pixels micro lens block MLB. A micro lens block MLB (s, t) is correlated to one micro lens ML (s, t), for example. A micro lens block MLB (s, t) is not necessarily correlated one-to-one to one micro lens ML (s, t), and may be generated by pixel interpolation, etc.

A 6×6 pixel PIC (u, v) is assigned to each micro lens block MLB (s, t), as shown in FIG. 3. The image pickup unit 27 generates an analog RAW image signal corresponding to the electric charge generated by photoelectrical conversion of the light received by each pixel.

In this embodiment, as described later, the processing unit 32 performs interpolation based on digital RAW image data obtained from a RAW image signal, and generates pixel data L (u, v, s, t) of a pixel PIC (u, v) of each micro lens block MLB (s, t).

In this embodiment, pixel data L (u, v, s, t) with 6×6 pixels of each micro lens block MLB (s, t) has light ray information.

In a broad sense, light ray information is information about rays of light. Generally, to obtain light ray information, it is necessary to obtain a point (x, y, z) to pass a ray of light in a free space, and an angle (θ, φ) to pass the ray through that point. However, in a free space assumed for photographing with the digital camera 1, as radiance is unchanged at any point on a ray of light, general light ray information may be regarded as 4-dimensional light ray information. Namely, the light ray information mentioned here is information including information about a position of a point where a ray of light crosses a predetermined 2-dimensional manifold and an angle incident to the manifold. The predetermined manifold mentioned here is imaginary and optional. The predetermined manifold is a plane or a spherical plane. The manifold may not be a single thing, and may be composed of two different planes. Further, depending on applications of light ray information, light ray information may not be 4-dimensional, and may be 3-dimensional by considering only a vector in one direction on a plane and the angle (1-dimensional) formed by the vector and its ray of light, among the position (2-dimensional) of a point where a ray of light crosses a predetermined plane and the angle (2-dimensional) incident to the plane.

Further, light ray information may be described as information about two locations where two predetermined planes, i.e., first and second planes, cross each other. Such a method is described in U.S. Pat. No. 6,097,394, for example.

In the digital camera 1 of this embodiment, the plane of the micro lens array 25 may be considered to be a predetermined plane. In this case, a position on the plane may be assumed to be expressed by the coordinates (s, t), and an incident angle to the plane may be expressed by the coordinates (u, v).

The AFE 29 executes predetermined analog front-end processing on an analog image signal input from the image pickup unit 27. Further, the AFE 29 coverts the obtained image signal to a digital signal, and writes the A/D converted digital RAW image data into the work memory 31.

The work memory 31 temporarily stores data before or after processing by the processing unit 32. The work memory 31 is a synchronous DRAM (SDRAM), for example.

The processing unit 32 encodes and decodes image data obtained by photographing, as described later. The processing unit 32 is a digital signal processor (DSP), for example. The operation of the processing unit 32 will be explained later in detail. The processing unit 32 is an example of a coding unit.

The internal memory 35 is a semiconductor memory, such as a flash memory, for example, and is incorporated in being fixed in the digital camera 1. The internal memory 35 stores data of an image obtained by photographing, and inputs/outputs the image data to/from the signal cable 21 through the memory interface 33.

The detachable memory 39 is a memory card comprising a flash memory, for example, and is detachably incorporated in the digital camera 1. The detachable memory 39 stores data of an image obtained by photographing, and inputs/outputs the image data to/from the signal cable 21 through the memory interface 37.

The video memory 41 temporarily stores image data for display generated by the processing unit 32. The display 43 displays an image corresponding to the image data stored in the video memory 41. The display 43 is a liquid crystal display, for example.

The external interface 45 inputs/outputs data to/from external equipment of the digital camera 1. The external interface 45 is a universal serial bus (USB interface), for example.

The flash memory 47 stores various programs to execute photographing, and parameters to execute various processing.

The CPU 48 executes a program read from the flash memory 47, and totally controls the operations of the digital camera 1.

Figure 4:
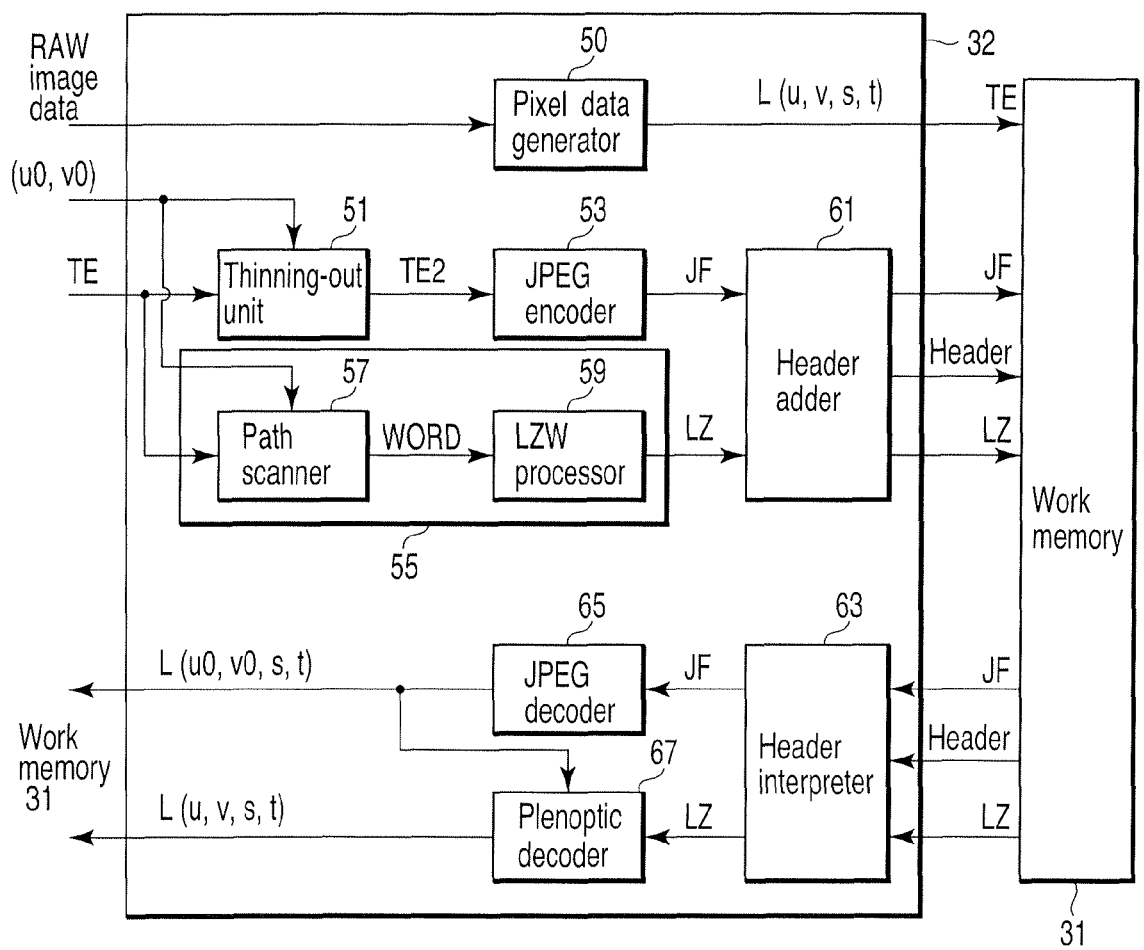
FIG. 4 is a block diagram for explaining some of the functions of a processing unit shown in FIG. 1.

Hereinafter, an explanation will be given on the processing unit 32 shown in FIG. 1. FIG. 4 is a block diagram for explaining some of the functions of the processing unit 32 shown in FIG. 1.

As shown in FIG. 4, the processing unit 32 has a pixel data generator 50, thinning-out unit 51, a joint photographic experts group (JPEG) encoder 53, a plenoptic encoder 55, a header adder 61, a header interpreter 63, a JPEG decoder 65, and a plenoptic decoder 67, as function blocks.

Some of the hardware, i.e., pixel data generator 50, thinning-out unit 51, JPEG encoder 53, plenoptic encoder 55, header adder 61, header interpreter 63, JPEG decoder 65, and plenoptic decoder 67 need not be configured as a DSP, and may be configured as an exclusive hardware circuit. Some or all of these functions may be realized by a processor other than a DSP.

The processes of the processing unit 32 are largely divided into generation of pixel data L (u, v, s, t), coding of pixel data L (u, v, s, t), decoding of the coded pixel data L (u, v, s, t), and display of an image corresponding to the decoded pixel data.

Hereinafter, each of these operations will be explained.

Figure 5:
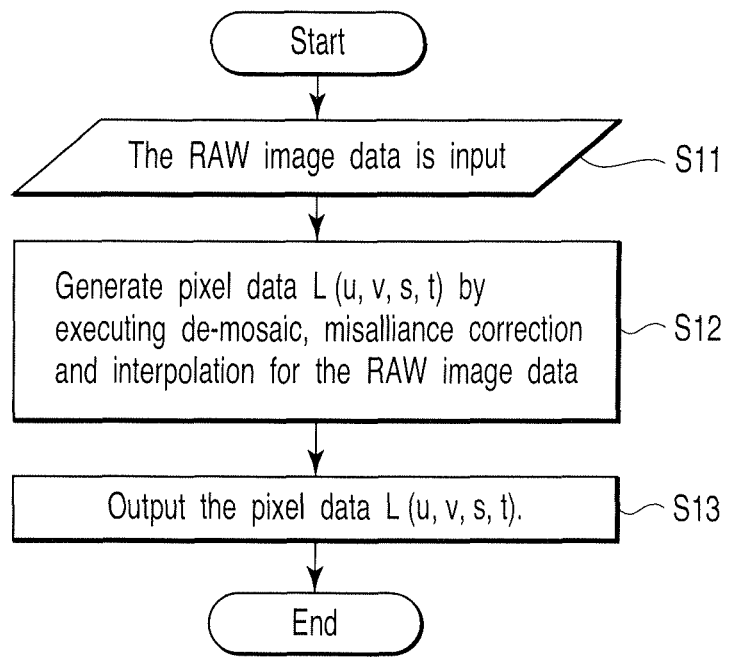
FIG. 5 is a flowchart for explaining the processing steps of a pixel data generator shown in FIG. 4.

First, the pixel data generator 50 will be explained. FIG. 5 is a flowchart for explaining the processing steps of the pixel data generator 50.

Step S11:

The pixel data generator 50 reads RAW image data from the work memory 31, for example.

Step S12:

The pixel data generator 50 executes de-mosaic, misalliance correction and interpolation, on the read RAW image data. The de-mosaic is a process to complete color information by collecting insufficient color information from surrounding pixels, and giving such information to each pixel upon photographing, and to create a full-color image. For example, in a one-panel type image sensor adopted in many digital cameras, each pixel has only single-color information, and requires de-mosaic. In the case of the 3-plate type, de-mosaic is unnecessary. Misalliance correction is a process to correct lateral misalliance between the arrangement of a micro lens ML (s, t) of the micro lens array 25 shown in FIG. 3 and the arrangement of a micro lens block MLB of the image pickup unit 27, by rotating the image indicated by the RAW image data, for example. Interpolation is performed to enable each micro lens block MLB to include a predetermined number of pixel data, for example.

Step S13:

The pixel data generator 50 writes the pixel data L (u, v, s, t) of one frame generated in the step S12, into the work memory 31, as an image data to be encoded TE. The pixel data L (u, v, s, t) is an example of light ray information.

Next, explanations will be given on the thinning-out unit 51 used for coding image data to be encoded TE, JPEG encoder 53, plenoptic encoder 55, and header adder 61.

Figure 6:
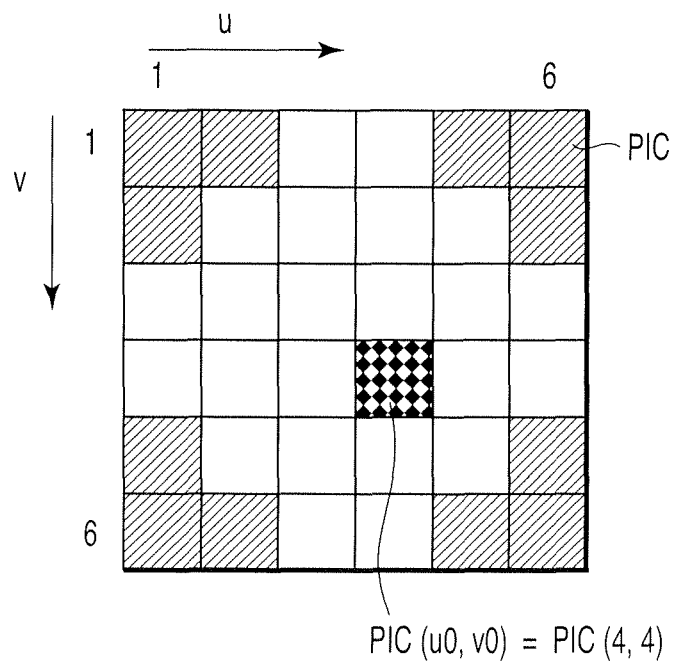
FIG. 6 is a diagram for explaining a micro lens block in an embodiment of the invention.
Figure 7:
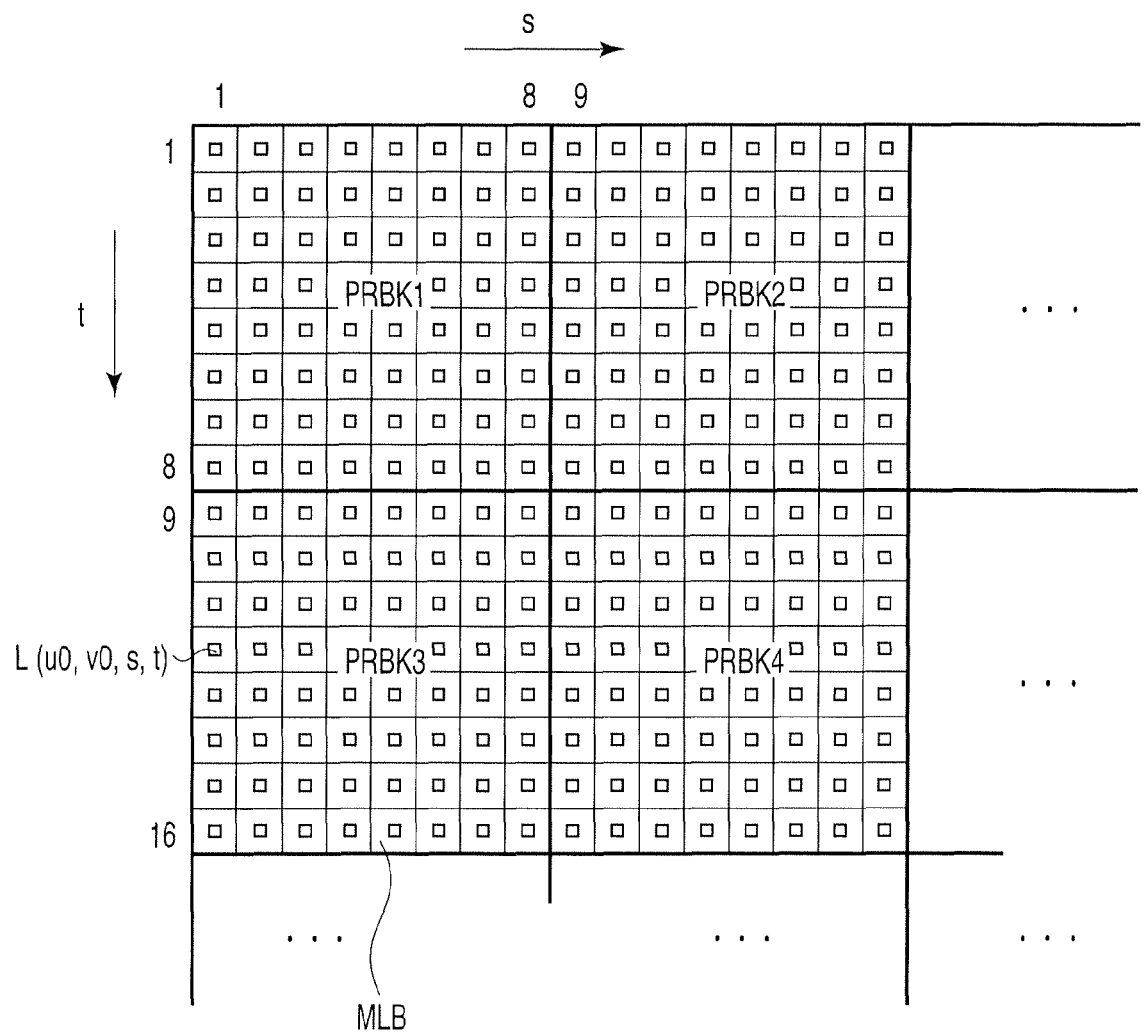
FIG. 7 is a diagram for explaining a processing block in an embodiment of the invention.

The thinning-out unit 51 generates image data TE2 by thinning out the pixel data L (u, v, s, t) of a pixel PCI (u, v) other than a pixel PIC (u0, v0) that is a pixel PIC (4, 4) in each micro lens block MLB, among the pixel data L (u, v, s, t) composing the image data to be encoded TE, as shown in FIG. 6. By thinning out the data, the image data TE2 becomes data including pixel data L (u0, v0, s, t), as shown in FIG. 7.

The JPEG encoder 53 executes JPEG coding on the image data TE2 generated by the thinning-out unit 51, and generates a JPEG Huffman code JF. The JPEG Huffman code JF is an example of first image information, and the coding by the JPEG encoder 53 is an example of a first coding process. In this embodiment, the JPEG coding is illustrated as an example of the first coding process, but another type of spatial frequency conversation may be used.

Specifically, the JPEG encoder 53 subjects the image data TE2 to DCT conversion, and generates a DCT conversion coefficient K. The JPEG encoder 53 quantizes the DCT conversion coefficient K. Then, the JPEG encoder 53 scans the quantized DCT conversion coefficient in a zigzag fashion, from a low frequency component (DC) to a high frequency component. Then, the JPEG encoder 53 subjects the scanned DCT conversion coefficient to an entropy coding such as a Huffman coding, and generates a JPEG Huffman code JF.

The plenoptic coding unit 55 has a path scanner 57, and a LZW processor 59, as shown in FIG. 4.

Figure 8A:
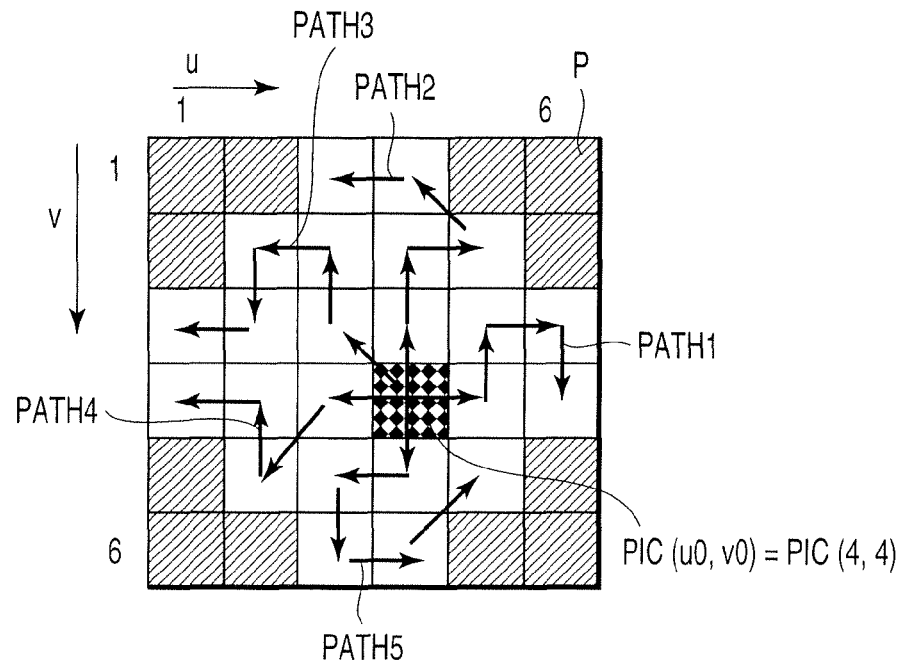
FIG. 8A is a diagram for explaining a coding method of a micro lens block in an embodiment of the invention.

As described above, the JPEG encoder 53 encodes the image data TE2 including the pixel data L (u0, v0, s, t). Contrarily, the plenoptic encoder 55 generates a word string data WORD by lossless coding pixel data L (u, v, s, t) other than the pixel data L (u0, v0, s, t) in the image data to be encoded TE. The path scanner 57 scans pixel data L (u, v, s, t) of a pixel PIC (u, v) other than the pixel PIC (u0, v0), along five paths: PATH 1, PATH 2, PATH 3, PATH 4 and PATH 5, taking the pixel PIC (u0, v0) in each micro lens block MLB as a starting point, as shown in FIG. 8A.

Here, in scanning the PATH 1, the path scanner 57 generates difference data D (5, 4, s, t) between pixel data L (5, 4, s, t) and pixel data L (u0, v0, S, t), difference data D (5, 3, s, t) between pixel data L (5, 3, s, t) and pixel data L (5, 4, s, t), difference data D (6, 3, s, t) between pixel data L (6, 3, s, t) and pixel data L (5, 3, s, t), and difference data D (6, 4, s, t) between pixel data L (6, 4, s, t) and pixel data L (6, 3, s, t). The path scanner 57 generates a word, WORD 1 including the difference data D (5, 4, s, t), D (5, 3, s, t), D (6, 3, s, t) and D (6, 4, s, t).

Further, in scanning the PATH 2, the path scanner 57 generates difference data D (4, 3, s, t) between pixel data L (4, 3, s, t) and pixel data L (u0, v0, s, t), difference data D (4, 2, s, t) between pixel data L (4, 2, s, t) and pixel data L (4, 3, s, t), difference data D (5, 2, s, t) between pixel data L (5, 2, s, t) and pixel data L (4, 2, s, t), difference data D (4, 1, s, t) between pixel data L (4, 1, s, t) and pixel data L (5, 2, s, t), and difference data D (3, 1, s, t) between pixel data L (3, 1, s, t) and pixel data L (4, 1, s, t). The path scanner 57 generates a word, WORD 2 including the difference data D (4, 3, s, t), D (4, 2, s, t), D (5, 2, s, t), D (4, 1, s, t), and D (3, 1, s, t).

Further, in scanning the PATH 3, the path scanner 57 generates difference data D (3, 3, s, t) between pixel data L (3, 3, s, t) and pixel data L (u0, v0, s, t), difference data D (3, 2, s, t) between pixel data L (3, 2, s, t) and pixel data L (3, 3, s, t), difference data D (2, 2, s, t) between pixel data L (2, 2, s, t) and pixel data L (3, 2, s, t), difference data D (2, 3, s, t) between pixel data L (2, 3, s, t) and pixel data L (2, 2, s, t), and difference data D (1, 3, s, t) between pixel data L (1, 3, s, t) and pixel data L (2, 3, s, t). The path scanner generates a word, WORD 3 including the difference data D (3, 3, s, t), D (3, 2, s, t) D (2, 2, s, t), D (2, 3, s, t), and D (1, 3, s, t).

Further, in scanning the PATH 4, the path scanner 57 generates difference data D (3, 4, s, t) between pixel data L (3, 4, s, t) and pixel data L (u0, v0, s, t), difference data D (2, 5, s, t) between pixel data L (2, 5, s, t) and pixel data L (3, 4, s, t), difference data D (2, 4, s, t) between pixel data L (2, 4, s, t) and pixel data L (2, 5, s, t), difference data D (1, 4, s, t)

between pixel data L (1, 4, s, t) and pixel data L (2, 4, s, t). The path scanner generates a word, WORD 4 including the difference data D (3, 4, s, t), D (2, 5, s, t) D (2, 4, s, t), and D (1, 4, s, t).

Further, in scanning the PATH 5, the path scanner 57 generates difference data D (4, 5, s, t) between pixel data L (4, 5, s, t) and pixel data L (u0, v0, s, t), difference data D (3, 5, s, t) between pixel data L (3, 5, s, t) and pixel data L (4, 5, s, t), difference data D (3, 6, s, t) between pixel data L (3, 6, s, t) and pixel data L (3, 5, s, t), difference data D (4, 6, s, t) between pixel data L (4, 6, s, t) and pixel data L (3, 6, s, t), and difference data D (5, 5, s, t) between pixel data L (5, 5, s, t) and pixel data L (4, 6, s, t). The path scanner 57 generates a word, WORD 5 including the difference data D (4, 5, s, t), D (3, 5, s, t), D (3, 6, s, t), D (4, 6, s, t), and D (5, 5, s, t).

Figure 8B:
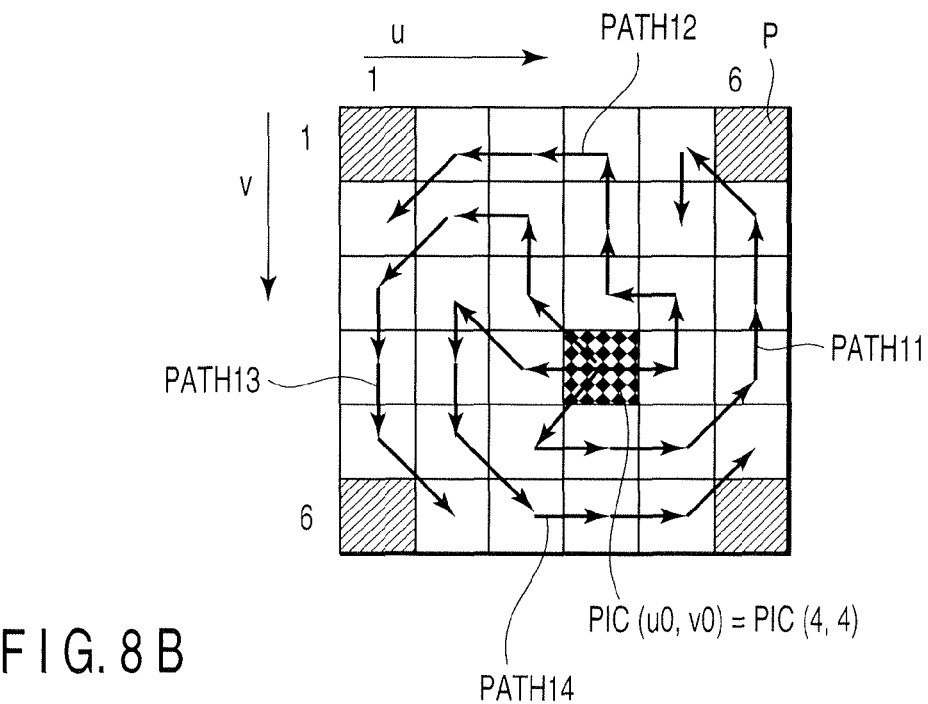
FIG. 8B is a diagram for explaining another coding method of a micro lens block in an embodiment of the invention.

Here, as effective pixel data is not obtained because of improper positions of the micro lens block MLB and micro lens ML, the above scanning is not performed for the pixel data L (1, 1, s, t), L (1, 2, s, t), L (2, 1, s, t), L (5, 1, s, t), L (6, 1, s, t) L (6, 2, s, t), L (1, 5, s, t), L (1, 6, s, t), L (2, 6, s, t), L (5, 6, s, t), L (6, 5, s, t), and L (6, 6, s, t) of the pixel PIC (u, v) at four corners in each micro lens block MLB, as shown in FIG. 6. The reason why effective pixel data is not obtained in the pixels at four corners in each micro lens block MLB is that the focusing lens 23a is shaped round, and a blurred circular image is projected on a micro lens block MLB through the focusing lens 23a. If the focusing lens 23a and zoom lens 23b are shaped square, data of pixels other than each one pixel at four corners in the micro lens ML becomes effective, for example, as shown in FIG. 8B. In this case, the path scanner 57 may scan along paths PATH 11-PATH 14 shown in FIG. 8B.

The path scanner 57 generates a word string data WORD by scanning the pixel data L (u, v, s, t) in each processing block data PRBK in the image data to be encoded TE shown in FIG. 7, for example, as described above. The processing block data PRBK is an example of a processing unit block. The micro lens block MLB is an example of two-dimensional block data.

Here, a processing block data PRBK includes pixel data L (u, v, s, t) of 8×8 (64) micro lens blocks MLB. Therefore, the path scanner 57 generates 320 (=5×8×8) word string data WORD for a processing block data PRBK.

Figure 9:
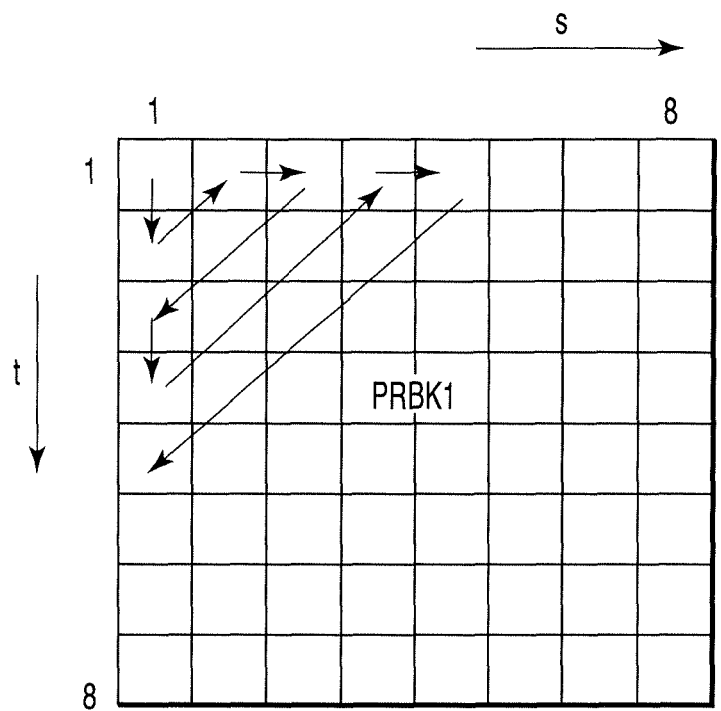
FIG. 9 is a diagram for explaining a zigzag scanning adopted in a coding method according to an embodiment of the invention.

The path scanner 57 generates a word string data WORD by sequentially arranging the words WORD 1-5 generated for 64 (8×8) micro lens blocks MLB in a processing block data PRBK, for example, by zigzag scanning, as shown in FIG. 9.

The LZW processor 59 compresses the word string data WORD input from the path scanner 57 to a LZW code, and generates a LZW compressed code LZ. The LZW processor 59 may perform a universal coding (LZ coding) on the basis of a dictionary other than LZW. The word string data WORD is an example of second image information, and the coding by the plenoptic encoder 55 is an example of a second coding process.

The header adder 61 generates a header data HEADER of the JPEG Huffman code JF generated by the JPEG encoder 53 and the LZW compressed code LZ generated by the LZW processor 59. In the header data HEADER, a pointer indicating the position of the LZW compressed code LZ, thumbnail image data, a file size, an image size, date/time of photographing, and other tag information are written. The processing unit 32 writes the header data HEADER generated by the header adder 61, pointer LZP to LZW compressed code LZ, JPEG thumbnail data THM, and JPEG Huffman code JF, into the internal memory 35 and detachable memory 39 in a file format with a data structure shown in FIG. 10.

The header interpreter 63 interprets the header data HEADER of the JPEG Huffman code JF and LZW compressed code LZ read from the work memory 31. The header interpreter 63 reads the pointer LZP to the LZW compressed code LZ, and holds it. The header interpreter 63 accesses the LZW compressed code LZ as a reading object, based on the pointer LZP, when reading the LZW compressed code LZ later. Further, the header interpreter 63 outputs the JPEG Huffman code read from the work memory 31 to the JPEG decoder 65, and outputs the LZW compressed code LZ to the plenoptic decoder 67.

The JPEG decoder 65 decodes the JPEG Huffman code JF, and generates JPEG decoded image data. The JPEG decoded image data including the pixel data L (u0, v0, s, t). The decoding by the JPEG decoder 65 corresponds to the encoding by the JPEG encoder 53 described before. Namely, the JPEG decoder 65 sequentially executes Huffman decoding, reverse quantizing and reverse DCT, on the JPEG Huffman code JF. The plenoptic decoder 67 decodes the LZW compressed code LZ, based on the JPEG decoded image data, and generates pixel data L (u, v, s, t) other than the pixel data L (u0, v0, s, t). The decoding by the plenoptic decoder 67 corresponds to the encoding by the plenoptic encoder 55 described before, for example.

Hereinafter, an explanation will be given on examples of the operation of the digital camera 1.

[Image Data Recording Process]

Figure 11:
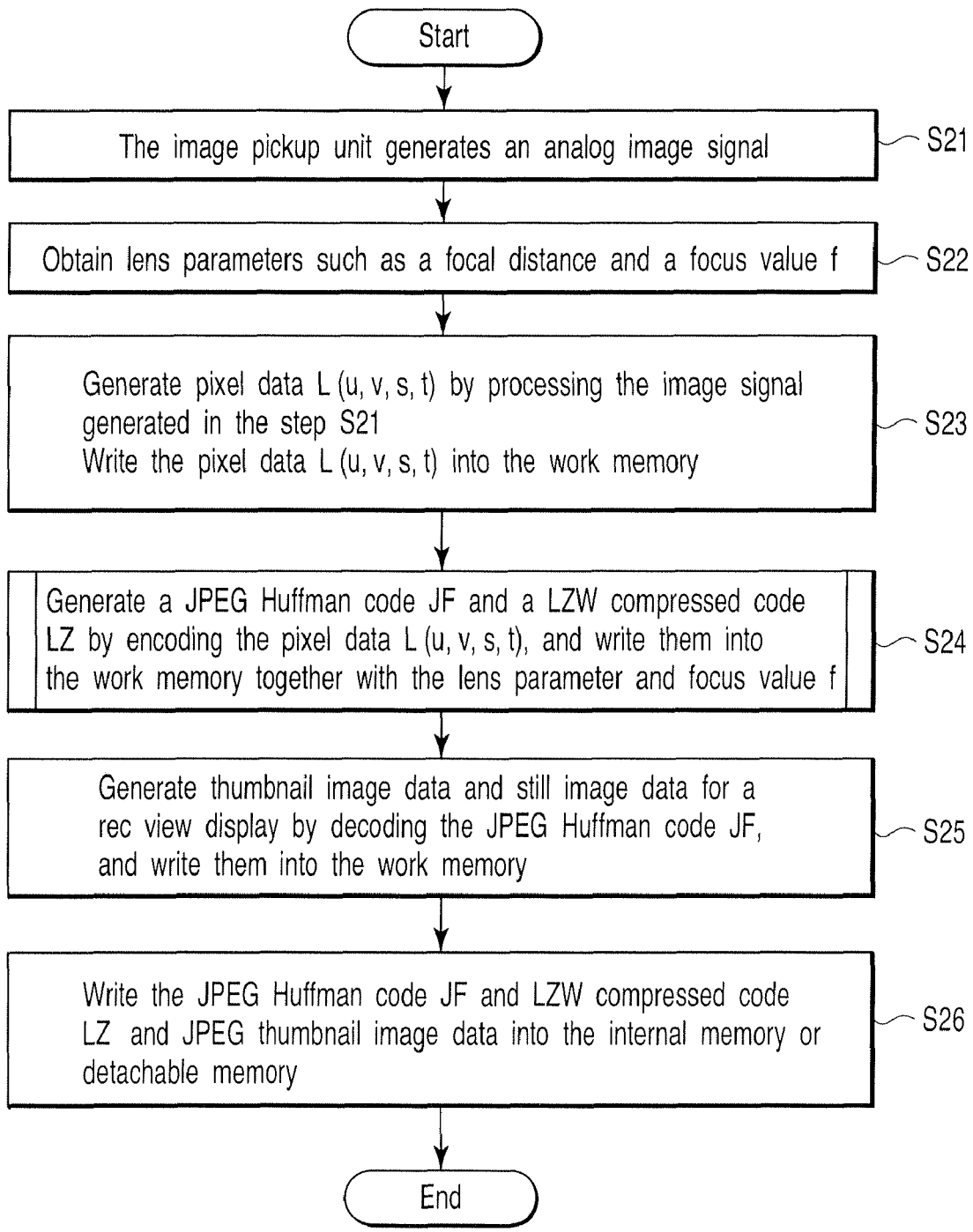
FIG. 11 is a flowchart for explaining the process of coding image data and writing the data into a work memory according to the result of image formation by the image pickup unit shown in FIG. 1.
Figure 12:
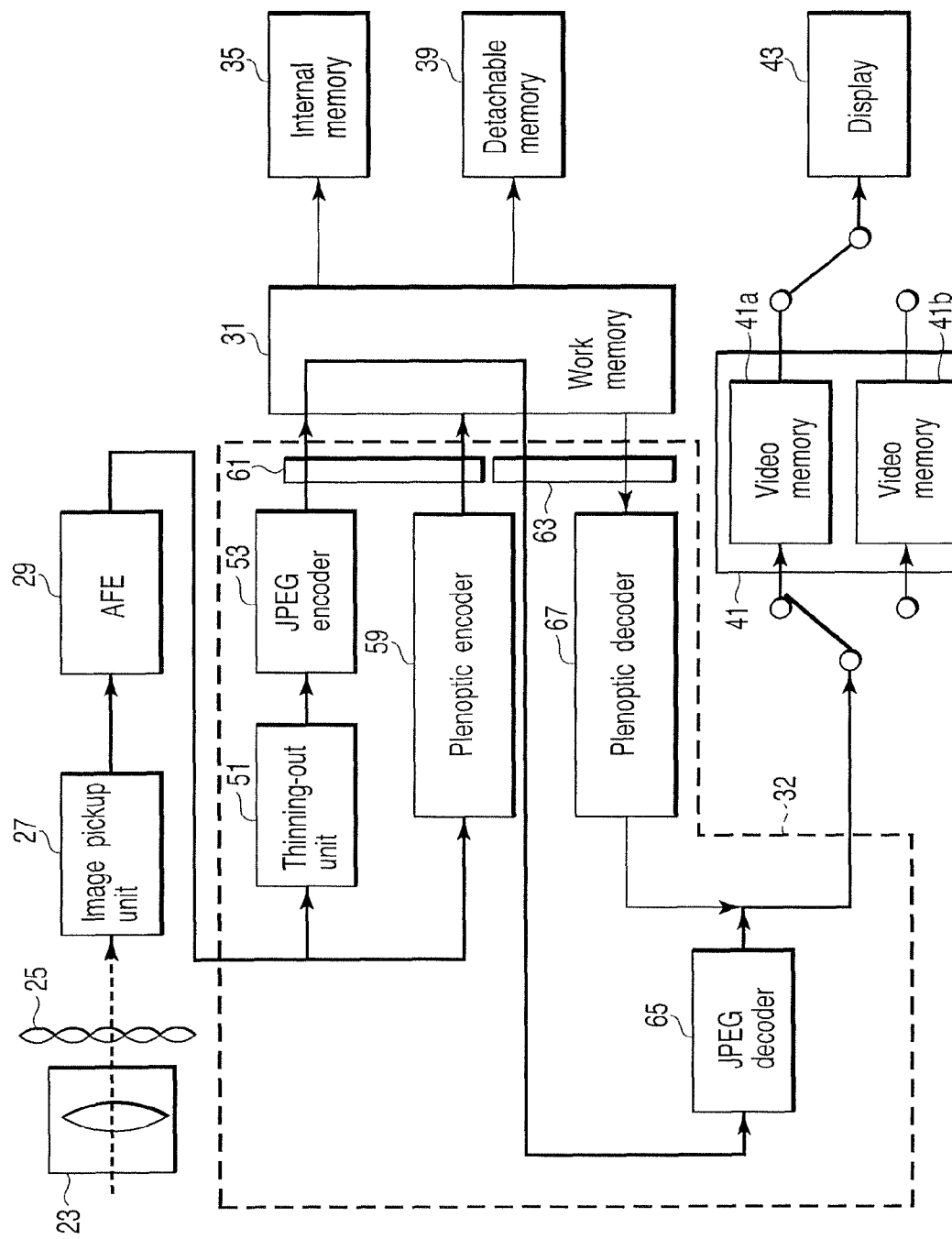
FIG. 12 is a diagram for explaining the flow of data in the process shown in FIG. 11.

FIG. 11 is a flowchart for explaining the process of coding image data and writing the data into the work memory 31, according to the result of image formation by the image pickup unit 27. FIG. 12 is a diagram for explaining the flow of data in the process shown in FIG. 11.

Each step shown in FIG. 11 will be explained hereinafter by referring to FIG. 12. The order of executing some of the steps shown below is optional. Some steps may be executed in parallel.

Step S21:

When the release switch of the operating unit 22 is turned on, the image pickup unit 27 receives light from a subject by each pixel, photoelectrically converts the light received by each pixel, and generates an analog RAW image signal corresponding to the electric charge generated by the photoelectric conversion.

Step S22:

When the RAW image signal is generated in the step S21, the processing unit 32 obtains the lens parameter and focus value f used in the optical system 23. The focus value f corresponds one-to-one to the subject distance 21E in FIG. 19B. Therefore, it is possible to calculate and obtain a value of the subject distance corresponding to the focus value f, instead of the focus value f. Hereinafter, the subject distance calculated in this way will also be indicated by f. In a fixed-focal distance camera, it is unnecessary to obtain a focus value. However, for reproduction, it is allowable to obtain a value f of a Hyper-focal distance specific to a camera as a focus value.

Step S23:

The AFE 29 executes predetermined analog front-end processing on the analog image signal input from the image pickup unit 27, and writes the digital RAW image data obtained by A/D conversion of the processed image signal into the work memory 31. The pixel data generator 50 reads the RAW image data from the work memory 31, executes de-mosaic, misalliance correction and interpolation, etc. of the image data, and generates pixel data L (u, v, s, t). Then, the pixel data generator 50 writes an image data to be encoded TE including pixel data L (u, v, s, t) into the work memory 31 for each frame.

Step S24:

The processing unit 32 reads the image data to be encoded TE from the work memory 31, encodes the data, and generates a JPEG Huffman code JF and a LZW compressed code LZ. Then, the processing unit 32 writes them into the work memory 31, together with the lens parameter and focus value f obtained in the step S22. Here, the coding and other processes are executed in the thinning-out unit 51, JPEG encoder 53, plenoptic coding unit 55, and header adder 61 shown in FIG. 4. The process in the step S24 will be described later in detail by referring to FIG. 13.

Step S25:

The header interpreter 63 reads the JPEG Huffman code JF from the work memory 31, interprets the header data HEADER, and decodes the JPEG Huffman code JF by sending it to the JPEG decoder 65. The pixel data L (u0, v0, s, t) is generated by this process. Then, the processing unit 32 generates thumbnail image data and quick view displaying image, based on the decoded pixel data L (u0, v0, s, t). Then, the processing unit 32 writes the quick view displaying image and thumbnail image data obtained by coding the thumbnail image data to JPEG data, into the work memory 31. Here, when a thumbnail display instruction is received, the processing unit 32 generates thumbnail image data by decoding the coded thumbnail image data, and writes it into the video memory 41. The thumbnail image is displayed on the display 43 by this process. The thumbnail image data are image data for displaying an index image including two or more thumbnail images on the display 43, when an index display instruction is received.

Step S26:

The processing unit 32 reads the JPEG Huffman code JF, LZW compressed code LZ and thumbnail JPEG image written into the work memory 31, from the work memory 31, and writes them into the internal memory 35 or detachable memory 39.

[Coding Process (Step S24 in FIG. 11)]

Figure 13:
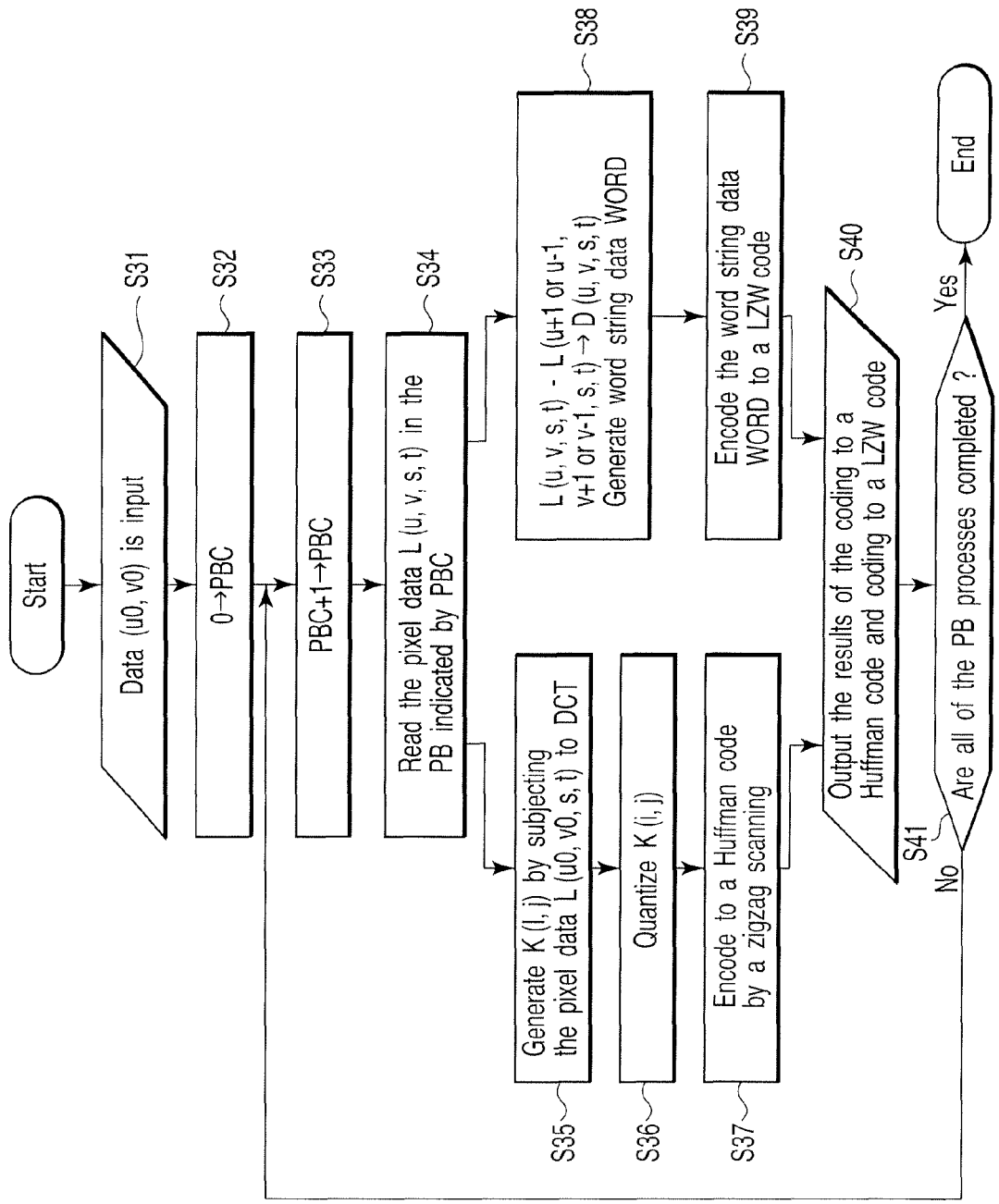
FIG. 13 is a flowchart for explaining the processes in the step S24 shown in FIG. 11.

FIG. 13 is a flowchart for explaining the processes in the step S24 shown in FIG. 11 in detail. In this embodiment, the processes in steps S35-S37 (JPEG encoding) and processes in steps S38 and S39 (LZW encoding) shown in FIG. 13 may be executed in parallel.

Step S31:

In the processing unit 32, information for specifying a pixel PIC (u0, v0) used to generate a JPEG Huffman code JF is input. The information for specifying the pixel PIC (u0, v0) is previously stored in a predetermined memory, for example. In this embodiment, u0=v0=4. This is because a center pixel in the micro lens block ML is considered to have most effective information.

Step S32:

The processing unit 32 assigns an initial value "0" to a variable PBC. Here, the value indicated by the variable PBC specifies processing block data PRBK to be encoded shown in FIG. 7.

Step S33:

The processing unit 32 increments the value set in the variable PBC by only "1".

Step S34:

The processing unit 32 reads the pixel data L (u, v, s, t) in a processing block data PRBK, which is a coding object corresponding to the value indicated by the variable PBC, from the work memory 31.

Step S35:

The thinning-out unit 51 extracts the pixel data L (u0, v0, s, t) of the pixel data L (u, v, s, t) in the processing block data PEBK read in the step S34, and generates the image data TE2, based on the information input in the step S31. The JPEG encoder 53 executes DCT conversion on the image data TE2, and generates a DCT conversion coefficient K (i, j).

Step S36:

The JPEG encoder 53 quantizes the DCT conversion coefficient K (i, j) generated in the step S35.

Step S37:

The JPEG encoder 53 scans the DCT conversion coefficient quantized in the step S36, in a zigzag form from a low frequency component (DC) to a high frequency component. Then, the JPEG encoder 53 executes entropy coding such as Huffman coding on the scanned DCT conversion coefficient, and generates a JPEG Huffman code JF1.

Step S38:

The path scanner 57 in the plenoptic encoder 55 scans the pixel data of pixel PIC (u, v) other than the pixel PIC (u0, v0), with respect to the pixel data L (u, v, s, t) in a processing block data PRBK to be encoded, along five paths of PATH 1, PATH 2, PATH 3, PATH 4 and PATH 5, taking the pixel PIC (n0, v0) in each micro lens block MLB as a starting point, as shown in FIG. 8A. The path scanner 57 generates difference data D (u, v, s, t) different from the immediately previous pixel data L (u, v, s, t), with respect to the pixel data L (u, v, s, t) on the path, as described before. The path scanner 57 generates a word including difference data D (u, v, s, t). The path scanner 57 generates a word string data WORD by sequentially arranging the words WORD 1-5 generated for 64 (8×8) micro lens blocks MLB in a processing block data PRBK, for example, by zigzag scanning, as shown in FIG. 9.

Step S39:

The LZW processor 59 executes LZW compression on the word string data WORD input from the path scanner 57, and generates a LZW compressed code LZ1.

Step S40:

The header adder 61 generates a header data HEADER of the JPEG Huffman code JF generated by the JPEG encoder 53 and the LZW compressed code LZ generated by the LZ processor 59, and writes it into the work memory 31 by correlating these codes with the header data.

Step S41:

The processing unit 32 judges whether the process is completed for all processing data PRBKs in the image data to be encoded TE, and terminates the processes in the step S24, when the process is completed. Contrarily, when the process is not completed for all processing data PRBKs in the image data to be encoded TE, the process returns to the step S33.

Figure 10:
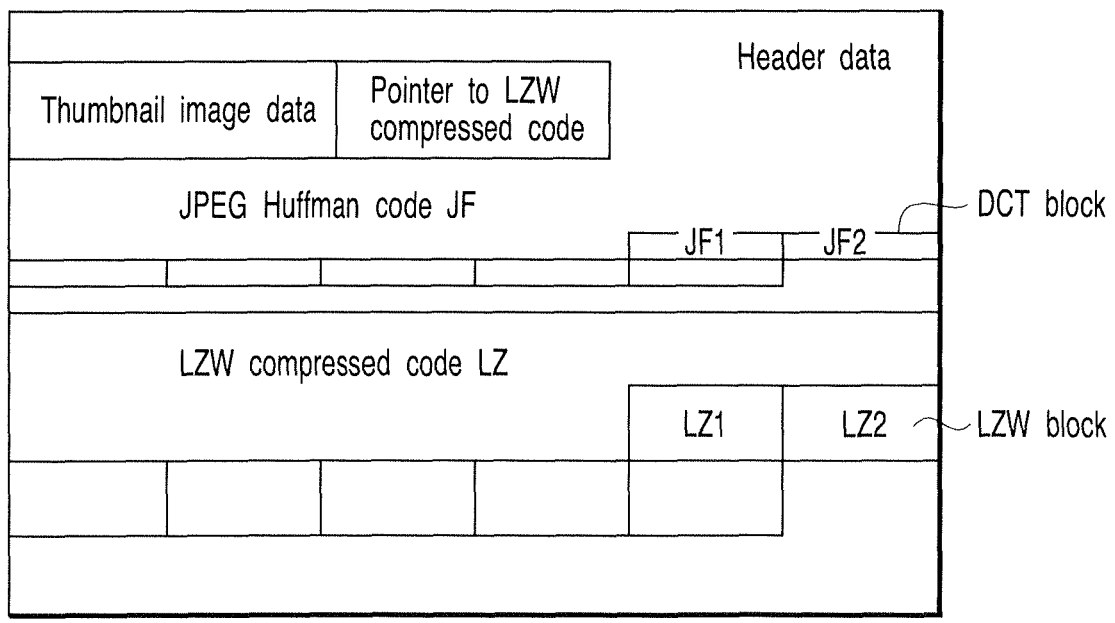
FIG. 10 is a diagram for explaining a recording format of image data coded in an embodiment of the invention.

As described above, the processing unit 32 writes the JPEG Huffman code JF (JF1, JF2, . . . ) and LZW compressed code LZ (LZ1, LZ2, . . . ) generated for each processing block data PRBK, into a JPEG Huffman code storing area and LZW compressed code storing area having a data structure shown in FIG. 10.

[Coding a Thumbnail Image]

Figure 14:
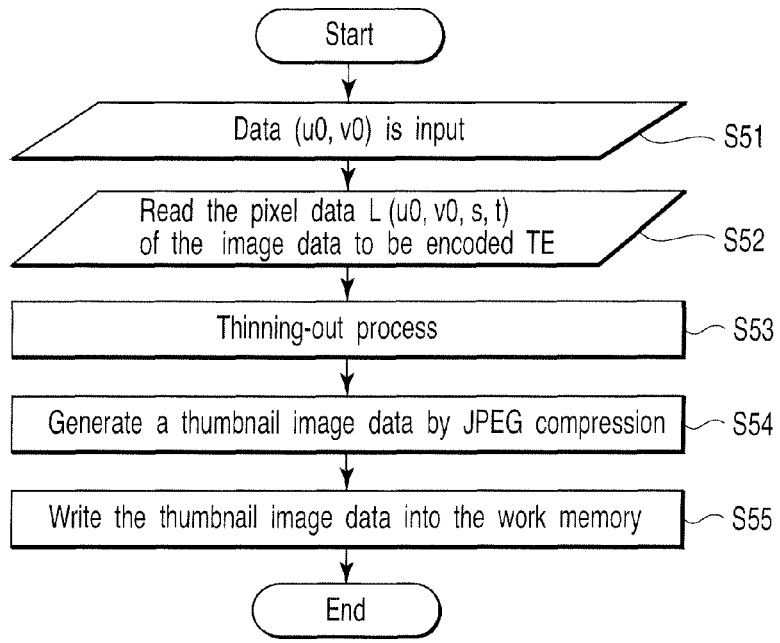
FIG. 14 is a flowchart for explaining a method of coding a thumbnail image in an embodiment of the invention.

FIG. 14 is a flowchart for explaining a process of coding a thumbnail image executed by the processing unit 32.

Step S51:

In the processing unit 32, information for specifying a pixel PIC (u0, v0) used to generate thumbnail image data is input.

Step S52:

The processing unit 32 reads the pixel data L (u0, v0, s, t) among the pixel data L (u, v, s, t) composing the image data to be encoded TE stored in the work memory 31, based on the information input in the step S51.

Step S53:

The processing unit 32 thins out the pixel data L (u0, v0, s, t) read in the step S52, and generates thumbnail image data to be encoded.

Step S54:

The processing unit 32 executes JPEG encoding on the thumbnail image data to be encoded generated in the step S53.

Step S55:

The processing unit 32 writes the encoded thumbnail image data generated in the step S54, into the work memory 31.

[Reproducing Process]

Figure 15:
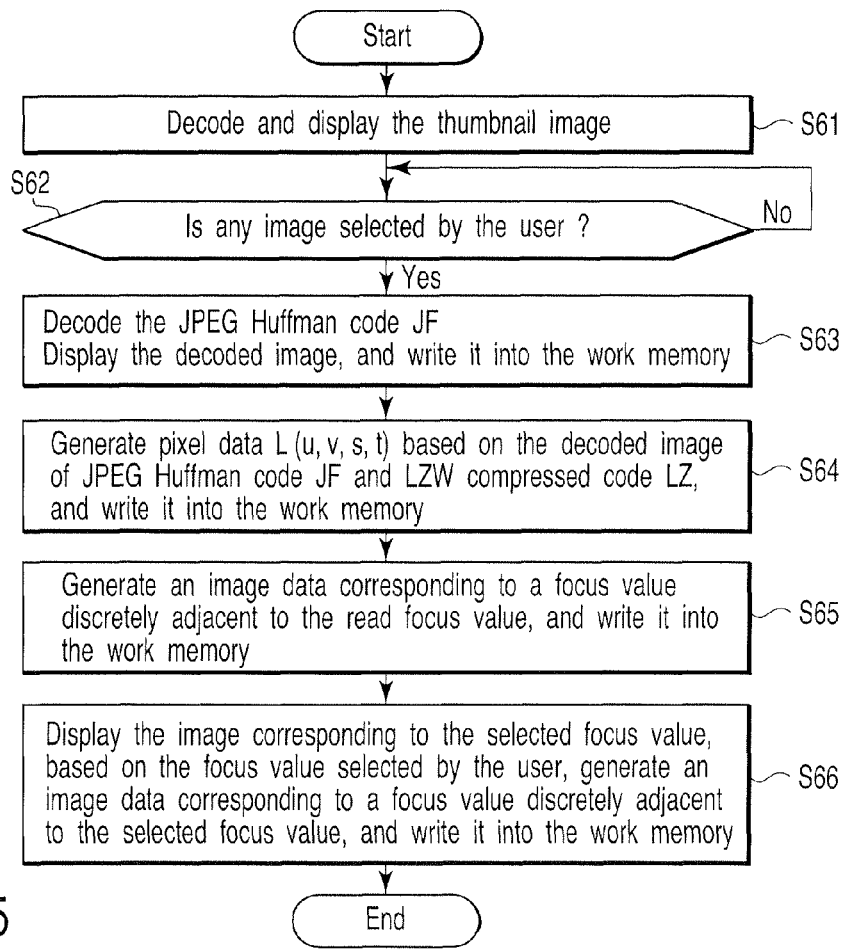
FIG. 15 is a flowchart for explaining a reproducing process in an embodiment of the invention.

FIG. 15 is a flowchart for explaining a reproducing process. Each step shown in FIG. 15 will be explained by referring to FIG. 16.

Step 61:

The processing unit 32 reads thumbnail image data (JPEG image data) from the internal memory 35 or detachable memory 39 shown in FIG. 1, for example, decodes the read thumbnail image data, and writes the decoded data into the video memory 41. Therefore, a thumbnail image is displayed on the display 43. Here, the JPEG encoded thumbnail image data including pixel data (u0, v0, s, t) obtained after the thinning-out process upon encoding.

Step S62:

The processing unit 32 judges whether one of the thumbnail images displayed on the display 43 is selected according to the user's operation of the operating unit and the process goes to the step S63, when one of the images is selected.

Step S63:

The processing unit 32 reads the JPEG Huffman code JF and LZW compressed code LZ of the image corresponding to the thumbnail image selected in the step S62, from the internal memory 35 or detachable memory 39, and writes the read codes into the work memory 31. The JPEG decoder 65 in the processing unit 32 reads the JPEG Huffman code JF corresponding to the thumbnail image selected in the step S62, from the work memory 31, decodes it, and generates JPEG decoded image data. The JPEG decoded image data including pixel data L (u0, v0, s, t).

The processing unit 32 writes the JPEG decoded image data into the video memory 41, and displays an image on the display 43 based on the JPEG decoded image data. The processing unit 32 writes the JPEG decoded image data into the work memory 31.

Step S64:

The JPEG decoder 65 generates pixel data L (u, v, s, t) other than the pixel data L (u0, v0, s, t) of the selected image, based on the JPEG decoded image data generated in the step S63 and the LZW compressed code LZ corresponding to the thumbnail image selected in the step S62, and writes it into the work memory 31. Then, the processing unit 32 generates image data of a focus value f based on the pixel data L (u, v, s, t), writes it into the video memory 41, and displays a corresponding image on the display 43.

Step S65:

In the step 63, the JPEG decoder 65 generates image data corresponding to a focus value discretely adjacent to the focus value f that is read by correlating to an image, by using the decoded pixel data L (u, v, s, t), and writes the generated image data into the work memory 31. The generation of the image data is performed based on the method disclosed in the aforementioned "Light Field Photography with a Hand-held Plenoptic Camera", Ren Ng et al, Stanford Tech Report CTSR 2005-2002, 2005, for example.

Step S66:

When a new focus value is selected by the user, the processing unit 32 displays an image corresponding to the new focus value on the display 43, and generates image data corresponding to a focus value adjacent to the new focus value, based on the pixel data L (u, v, s, t), and writes it into the work memory 31. At this time, the JPEG decoder 65 erases the image data corresponding to a focus value not adjacent to the newly selected focus value, from the work memory 31.

[Live View Displaying Process]

Figure 17:
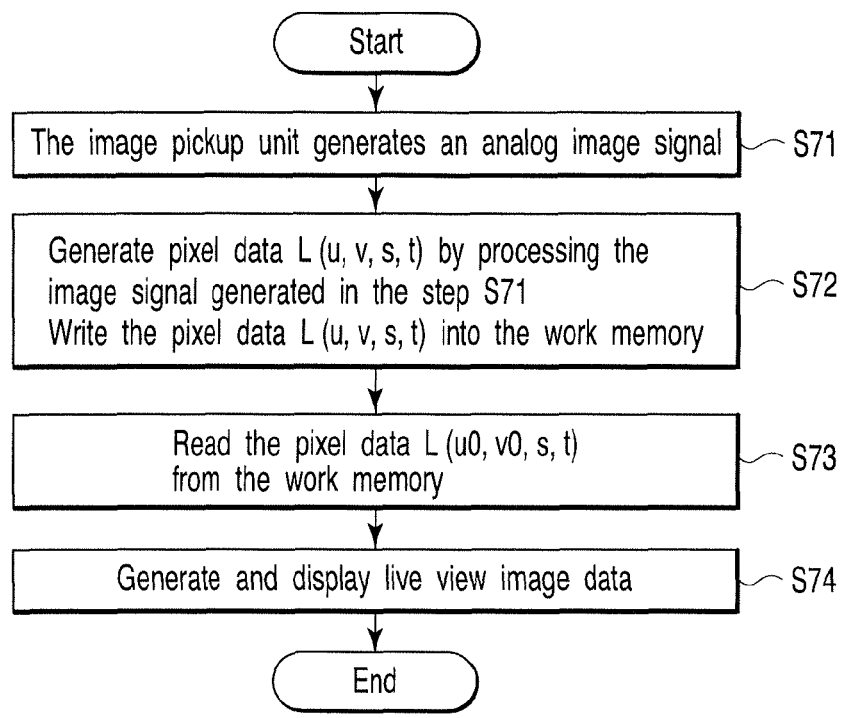
FIG. 17 is a flowchart for explaining a process of displaying a live view image in an embodiment of the invention.

FIG. 17 is a flowchart for explaining a process of displaying a live view image on the display 43 shown in FIG. 1.

Step S71:

The image pickup unit 27 generates an analog RAW image signal corresponding to the electric charge generated by photoelectric conversion of the light received by each pixel.

Step S72:

The AFE 29 executes predetermined analog front-end processing on an analog image signal input from the image pickup unit 27, and writes the processed digital RAW image data into the work memory 31. The pixel data generator 50 reads the RAW image data from the work memory 31, and generates pixel data L (u, v, s, t) by executing de-mosaic, misalliance correction, and interpolation for the read RAW image data. Then, the pixel data generator 50 writes the image data to be encoded TE including the pixel data L (u, v, s, t) for one frame into the work memory 31.

Step S73:

The processing unit 32 reads the pixel data L (u0, v0, s, t) among the pixel data L (u, v, s, t) written into the work memory 31 in the step S72.

Step S74:

The processing unit 32 generates live view image data based on the pixel data L (u0, v0, s, t) read in the step S73, and writes the generated live view image data into the video memory 41. By this process, a live view image is displayed on the display 43.

As explained hereinbefore, in the digital camera 1, an image data to be encoded including 4-dimensional light ray information is encoded, taking a processing block data PRBK as a unit, as explained by using FIG. 7 and FIG. 13.

Therefore, the load of the processing unit 32 caused by the coding can be reduced. A chip with a relative low processing capacity can be used, and a storage capacity demanded of the work memory 31 can be decreased.

Further, in the digital camera 1, as explained by using FIG. 13, the pixel data L (u0, v0, s, t) in the micro lens block MLB is encoded to JPEG data together with other pixel data L (u0, v0, s, t) in the same processing block data PRBK. Further, pixel data L (u, v, s, t) other than the pixel data L (u0, v0, s, t) in the micro lens block MLB is also encoded to LZW data together with pixel data L (u, v, s, t) other than the pixel data L (u0, v0, s, t) in the other micro lens blocks MLB in the same processing block data PRBK. At this time, processing of 8×8 blocks in the JPEG processing is executed in parallel with LZW compression of a processing block PRBK.

Therefore, in the digital camera 1, a processing load caused by coding can be decreased compared with spatial coding of all pixel data. This facilitates adaptation to a portable plenoptic camera. Further, the encoding speed is increased by executing the processing of 8×8 blocks in JPEG processing and LZW compression of a processing block PRBK in parallel in each processing block PRBK. Further, in the digital camera 1, pixel data L (u, v, s, t) other than the pixel data L (u0, v0, s, t) is encoded (lossless encoded) to LZW data in a micro lens block MLB, and light ray information can be coded with high quality without losing the amount of information. Namely, information about the direction of propagation of a light ray is losslessly coded, and necessary information is recorded without loss upon refocusing to various focus values. Therefore, a refocused image is very clear.

Further, in the digital camera 1, thumbnail image data is generated by thinning out the pixel data L (u0, v0, s, t) composing the image data to be encoded TE, and the generated image data is encoded, as shown in FIG. 14. Therefore, thumbnail image data can be generated with a relatively small processing load.

Further, in the digital camera 1, a live view image is displayed on the display 43 by writing pixel data L (u, v, s, t) into the work memory 31 upon photographing, and writing an image resized from the image obtained by reading the pixel data (u0, v0, s, t) from the work memory 31, into the video memory 41, as shown in FIG. 17.

Therefore, image processing for adding up the pixel data in a micro lens block MLB is unnecessary, and the load of processing can be decreased.

Figure 18:
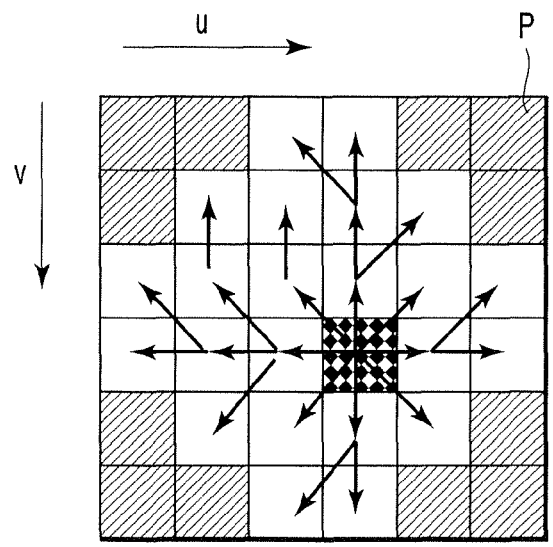
FIG. 18 is a diagram for explaining a modification of the coding process in an embodiment of the invention.
Figure 20:
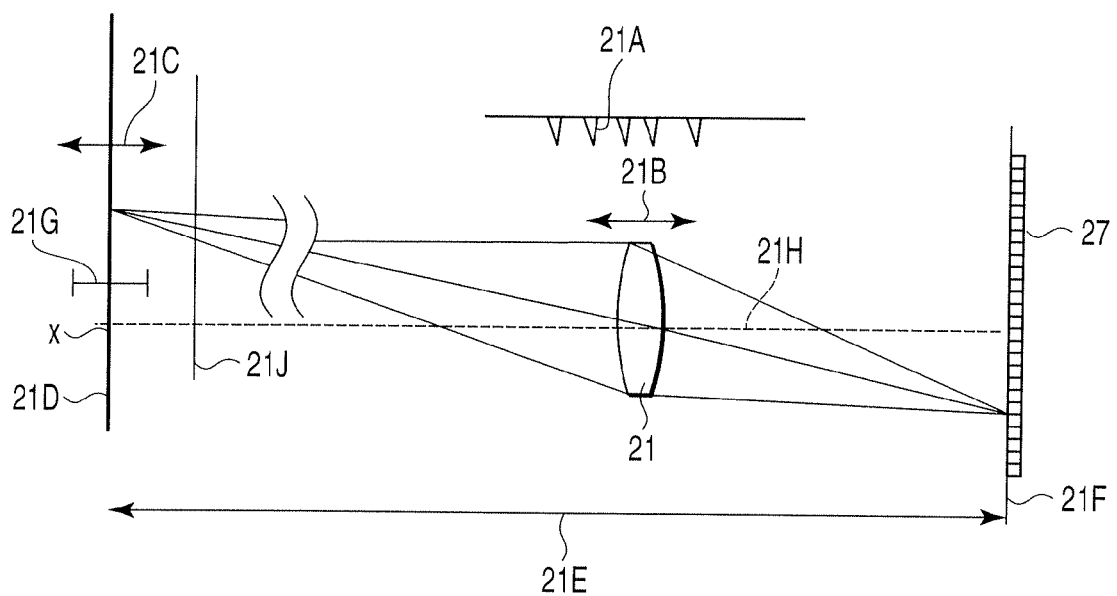
FIG. 20 is a diagram for explaining the principle of image pickup of an ordinary camera.

In the above description of the embodiment, as indicated by an arrow in FIG. 8A, a case of generating difference data D (u, v, s, t) between adjacent pixel data L (u, v, s, t) has been illustrated. However, a method of generating difference data D (u, v, s, t) is optional. For example, as shown in FIG. 18, it is allowed to generate difference data between one pixel data and two or more pixel data, and to encode that difference data.

The number of pixels composing a micro lens block MLB indicated in this embodiment, and the number of micro lens block MLBs composing a processing block data PRBK are just an example, and they may be freely set.

Further, in the above description of the embodiment, a case of forming an image on a pixel of the image pickup unit 27 by passing a light ray from a subject through the micro lens array 25, has been illustrated. However, a method of forming an image is not limited, as long as light enters a pixel just like including light ray information. It is allowed to form an image on a pixel of the image pickup unit 27 by reflecting a light ray from a subject by using a reflector.

Further, in the above description of the embodiment, a case of encoding and decoding light ray information by using the processing unit 32 realized by DSP, etc. has been illustrated. However, for example, these functions may be realized by executing a program in a microprocessor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of coding light ray information that is pixel data arranged in two dimensions obtained by receiving a ray of light from a subject by an image pickup element and includes information about a position on a predetermined surface and information about an incident angle when a ray of light from a subject enters the surface, comprising:
dividing the light ray information into two or more two-dimensional blocks including two or more of the pixel data and information about an angle of the ray of light spreading in a different direction from the subject;
obtaining two or more processing unit blocks, wherein each of two or more processing unit blocks comprises of two or more two-dimensional blocks;
executing a first coding process to obtain first block unit information composing first image information about the subject by coding each of the processing unit blocks; and
executing a second coding process to obtain second block unit information composing second image information different types from the first image information by coding each of the processing unit blocks,
wherein the first coding process is applied to pixel data of a predetermined pixel in each of the two or more two-dimensional blocks in the processing unit block and the second coding process is applied to pixel data of pixels other than the predetermined pixel, and
wherein the second coding process includes coding of a word which is obtained by sequentially generating two or more difference data between pixel data of adjacent pixels in the two-dimensional block, taking the predetermined pixel as a start point, and by arranging the generated two or more difference data in one dimension.

2. The coding method according to claim 1, wherein the second coding process is not applied to some of the pixels other than the predetermined pixel.

3. The coding method according to claim 1, wherein the first and second coding processes are executed in parallel.

4. The coding method according to claim 3, wherein the first coding process is lossy compression and the second coding process is lossless compression.

5. The coding method according to claim 4, wherein the first coding process is a coding process based on spatial frequency conversion and the second coding process is a coding process using a coding method based on LZ coding.

6. An electronic camera comprising:
a focusing lens;
a micro lens array which is arranged at a focal position of the focusing lens, and composed of two or more micro lenses;
an image pickup element which is composed of two or more pixels arranged in two dimensions to convert a subject image formed by sequentially passing the focusing lens and micro lens array, into an electric signal;
a coding unit which codes light ray information corresponding to the result of receiving light by the two or more pixels;
wherein the light ray information includes information about a position on a surface of the micro lens array and information about an incident angle to the surface of the micro lens array when a ray of light from the subject enters the surface via the focusing lens and micro lens array,
the coding unit divides the light ray information into two or more processing unit blocks, and executes a first coding process to obtain first block unit information composing first image information about the subject by coding each of the two or more processing unit blocks and a second coding process to obtain second block unit information composing second image information different types from the first image information by coding each of the processing unit blocks, wherein the first and second coding process are executed for each of the two or more processing blocks,
the first coding process is applied to pixel data of a predetermined pixel in each of the two or more two-dimensional blocks in the processing unit block and the second coding process is applied to pixel data of pixels other than the predetermined pixel, and
the second coding process includes coding of a word which is obtained by sequentially generating two or more difference data between pixel data of adjacent pixels in the two-dimensional block, taking the predetermined pixel as a start point, and by arranging the generated two or more difference data in one dimension.

7. The electronic camera according to claim 6, further comprising:
a display which displays an image; and
a display processing unit which displays an image obtained by subjecting image processing to an image corresponding to light ray information used for generating the first image information among the light ray information, as a live view.

8. The electronic camera according to claim 6, wherein the coding unit generates thumbnail image data by coding an image data obtained by image processing based on a light ray information used for generating the first image information among the light ray information.

9. The electronic camera according to claim 8, further comprising a recording unit which records the first and second image information, and thumbnail image data on a recording medium.

10. The electric camera according to claim 6, wherein a two-dimensional shape of a surface perpendicular to an optical axis of the focusing lens is substantially identical to a two-dimensional shape of each micro lens constituting the micro lens array.

11. A method of coding light ray information that is pixel data arranged in two dimensions obtained by receiving a ray of light from a subject by an image pickup element and includes information about a position on a predetermined surface and information about an incident angle when a ray of light from a subject enters the surface, comprising:

dividing the light ray information into two or more two-dimensional blocks including two or more of the pixel data and information about an angle of the ray of light spreading in a different direction from the subject;

obtaining two or more processing unit blocks, wherein each of two or more processing unit blocks comprises of two or more two-dimensional blocks;

executing a first coding process to obtain first block unit information composing first image information about the subject by coding each of the processing unit blocks; and executing a second coding process to obtain second block unit information composing second image information different types from the first image information by coding each of the processing unit blocks, wherein the first coding process is applied to pixel data of a predetermined pixel in each of the two or more two-dimensional blocks in the processing unit block and the second coding process is applied to pixel data of pixels other than the predetermined pixel, and wherein the second coding process is not applied to some of the pixels other than the predetermined pixel.

* * * * *